United States Patent
Chen et al.

(10) Patent No.: US 8,976,290 B2
(45) Date of Patent: Mar. 10, 2015

(54) POSITIONABLE MECHANISM WITH AN OPTICAL IMAGE STABILIZING UNIT

(75) Inventors: Tsung-Tse Chen, Taichung (TW); Chia-Lin Hung, Taichung (TW); Huo-Wang Chou, Taichung (TW)

(73) Assignee: Asia Optical International Ltd., Tortola, B.V.I. (GB)

(*) Notice: Subject to any disclaimer, the term of this patent is extended or adjusted under 35 U.S.C. 154(b) by 189 days.

(21) Appl. No.: 13/611,311

(22) Filed: Sep. 12, 2012

(65) Prior Publication Data

US 2013/0120599 A1 May 16, 2013

(30) Foreign Application Priority Data

Nov. 15, 2011 (TW) .............................. 100141612 A

(51) Int. Cl.
- *H04N 5/225* (2006.01)
- *H04N 5/228* (2006.01)
- *G03B 5/00* (2006.01)

(52) U.S. Cl.
CPC .......... *G03B 5/00* (2013.01); *G03B 2205/0038* (2013.01)
USPC .......................... 348/373; 348/374; 348/208.7

(58) Field of Classification Search
CPC .................................................. H04N 5/2252
USPC ...................... 348/373, 374, 208.7
See application file for complete search history.

(56) References Cited

U.S. PATENT DOCUMENTS

| 8,077,410 B2* | 12/2011 | Masuki .......................... 359/819 |
| 2009/0086037 A1* | 4/2009 | Chang et al. ................ 348/208.7 |
| 2009/0232483 A1* | 9/2009 | Anshita ............................ 396/55 |
| 2010/0284097 A1* | 11/2010 | Masuki .......................... 359/824 |
| 2010/0302437 A1* | 12/2010 | Kobayashi ..................... 348/374 |

FOREIGN PATENT DOCUMENTS

| TW | 201003116 | 1/2010 |
| TW | 201030370 | 8/2010 |

* cited by examiner

*Primary Examiner* — Nhan T Tran
*Assistant Examiner* — Chan Nguyen
(74) *Attorney, Agent, or Firm* — Trop Pruner & Hu, P.C.

(57) ABSTRACT

A positionable mechanism includes a base unit, a frame unit, an optical image stabilizing (OIS) unit and a positioning unit. The frame unit and the OIS unit are mounted on the base unit. The frame unit is retractable with respect to the base unit between a storage position and a working position, and has a first surface. The OIS unit includes a movable carrier that has a second surface facing the first surface, an optical element that is mounted on the movable carrier, and a driving element that is operable to drive the movable carrier to move with respect to the base unit. The positioning unit is disposed between the first surface and the second surface, and is configured to position the movable carrier with respect to the frame unit when the frame unit is at the storage position.

8 Claims, 5 Drawing Sheets

US 8,976,290 B2

POSITIONABLE MECHANISM WITH AN OPTICAL IMAGE STABILIZING UNIT

CROSS-REFERENCE TO RELATED APPLICATION

This application claims priority of Taiwanese Application No. 100141612, filed on Nov. 15, 2011.

BACKGROUND OF THE INVENTION

1. Field of the Invention

This invention relates to a camera, more particularly to a positionable mechanism with an optical image stabilizing unit for a camera.

2. Description of the Related Art

An optical image stabilizing (OIS) unit of a camera is generally implemented by moving a charge-coupled device (CCD) in a horizontal direction to calibrate image distortion caused by hand shacking. However, the OIS unit may wobble and generate noise when the camera is shutdown.

In U.S. Patent Application Publication No. 2009/0086037 A1 and Taiwanese Patent Application Publication No. 201003116, a conventional positionable mechanism generally utilizes a motor to drive a lever for stabilizing the OIS unit when the camera is shut down. However, the structure of the conventional positionable mechanism is complex and requires an additional motor so that it is hard to reduce the manufacturing cost.

Another conventional positionable mechanism as described in Taiwanese Patent Application Publication No. 201030370 is provided with a pair of springs between the OIS unit and a base unit to alleviate wobbling of the OIS unit. However, the springs also complicate the positionable mechanism and may cause undesirable hindrance against movement of the OIS unit.

SUMMARY OF THE INVENTION

Therefore, the object of the present invention is to provide a positionable mechanism with an optical image stabilizing unit for overcoming the aforesaid drawbacks of the prior art.

According to this invention, a positionable mechanism includes a base unit, a frame unit, an optical image stabilizing (OIS) unit and a positioning unit. The frame unit is mounted on the base unit, is movable with respect to the base unit between a storage position and a working position, and has a first surface. The OIS unit is mounted on the base unit and includes a movable carrier that has a second surface facing the first surface, an optical element that is mounted on the movable carrier, and a driving element that is operable to drive the movable carrier to move with respect to the base unit. The positioning unit is disposed between the first surface and the second surface and is configured to position the movable carrier with respect to the frame unit when the frame unit is at the storage position.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
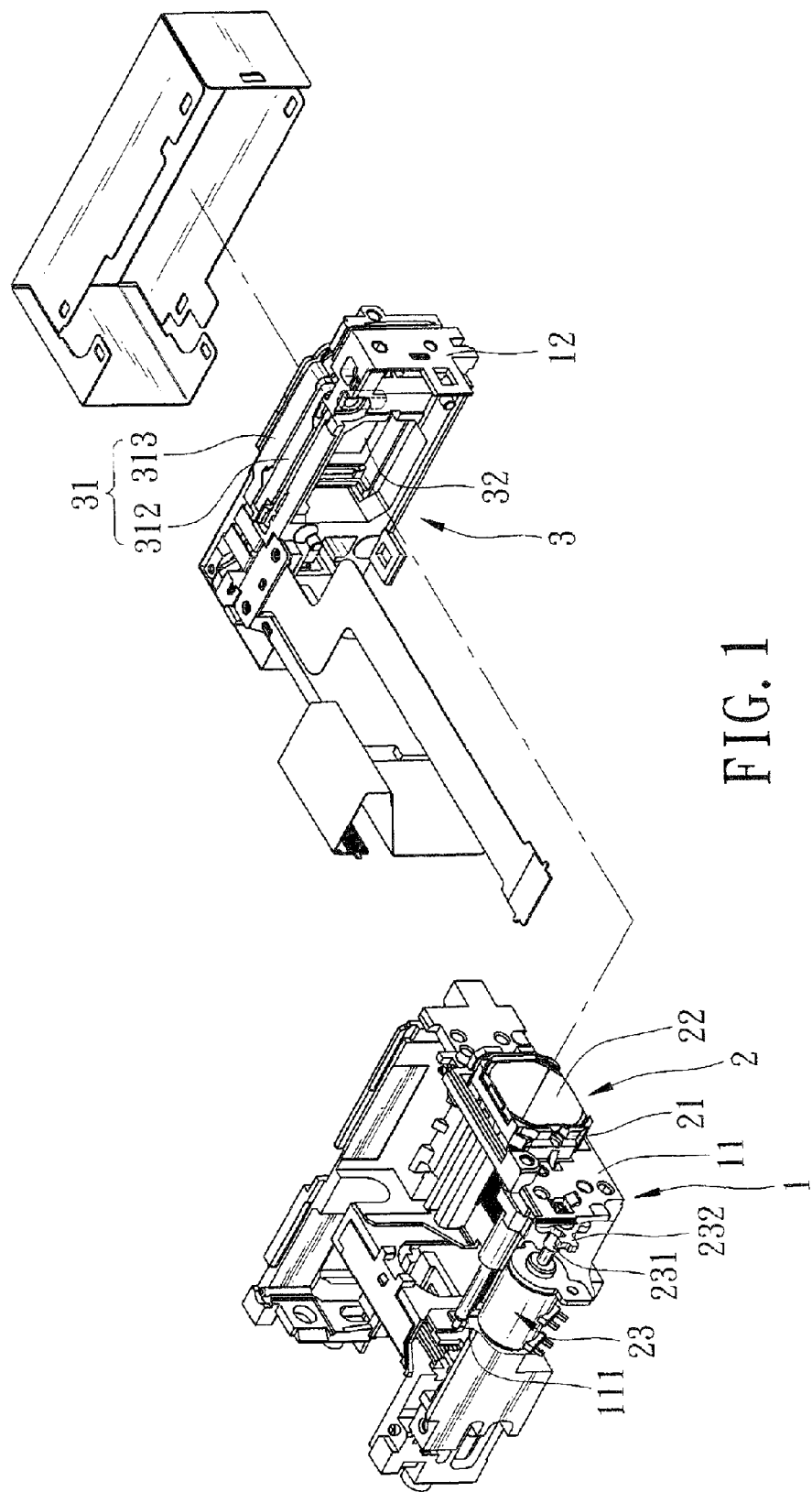
FIG. 1 is an exploded perspective view of the first preferred embodiment of a positionable mechanism according to this invention.
Figure 2:
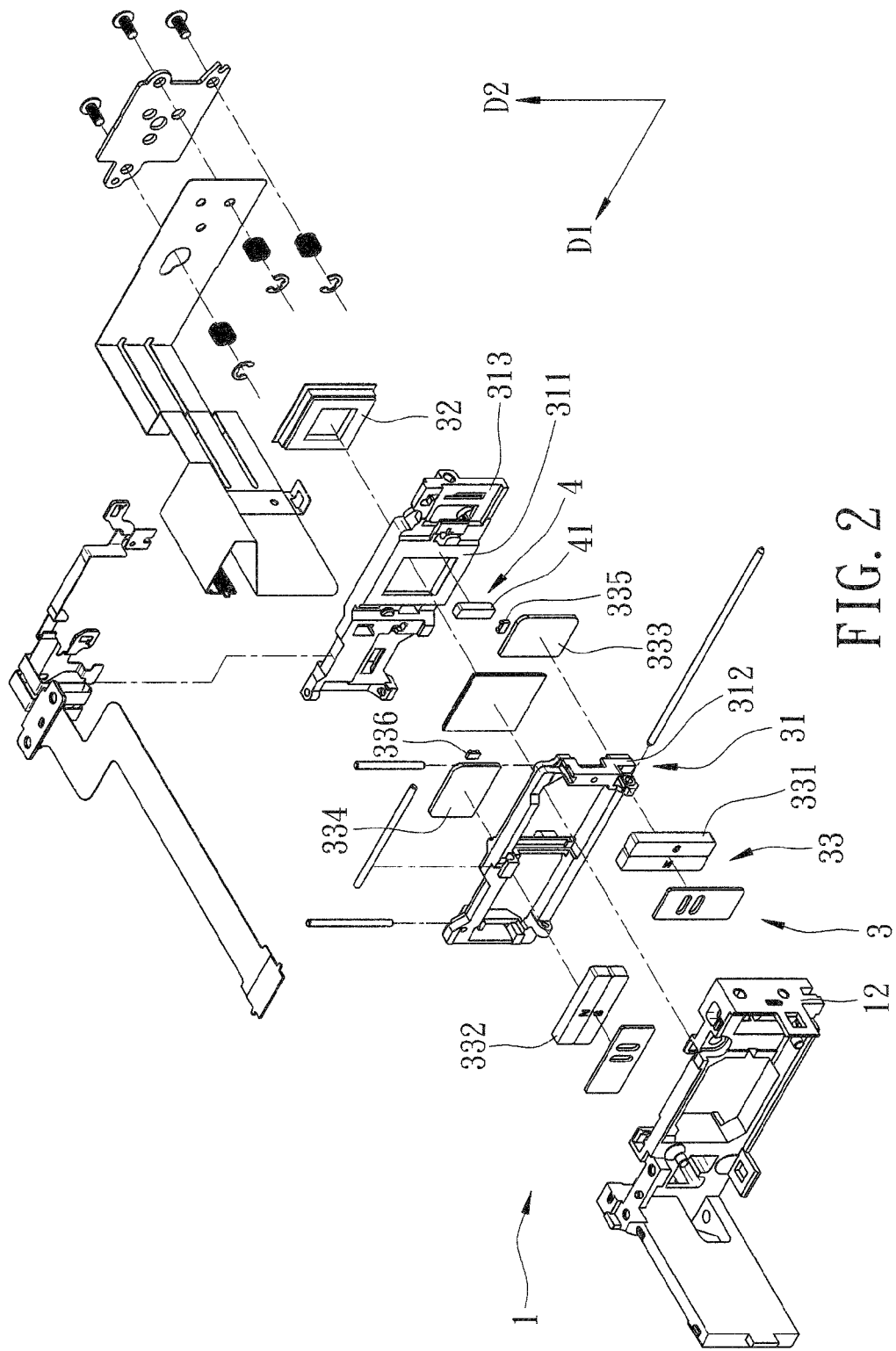
FIG. 2 is an exploded perspective view of an OIS base and an optical image stabilizing (OIS) unit of the first preferred embodiment.
Figure 3:
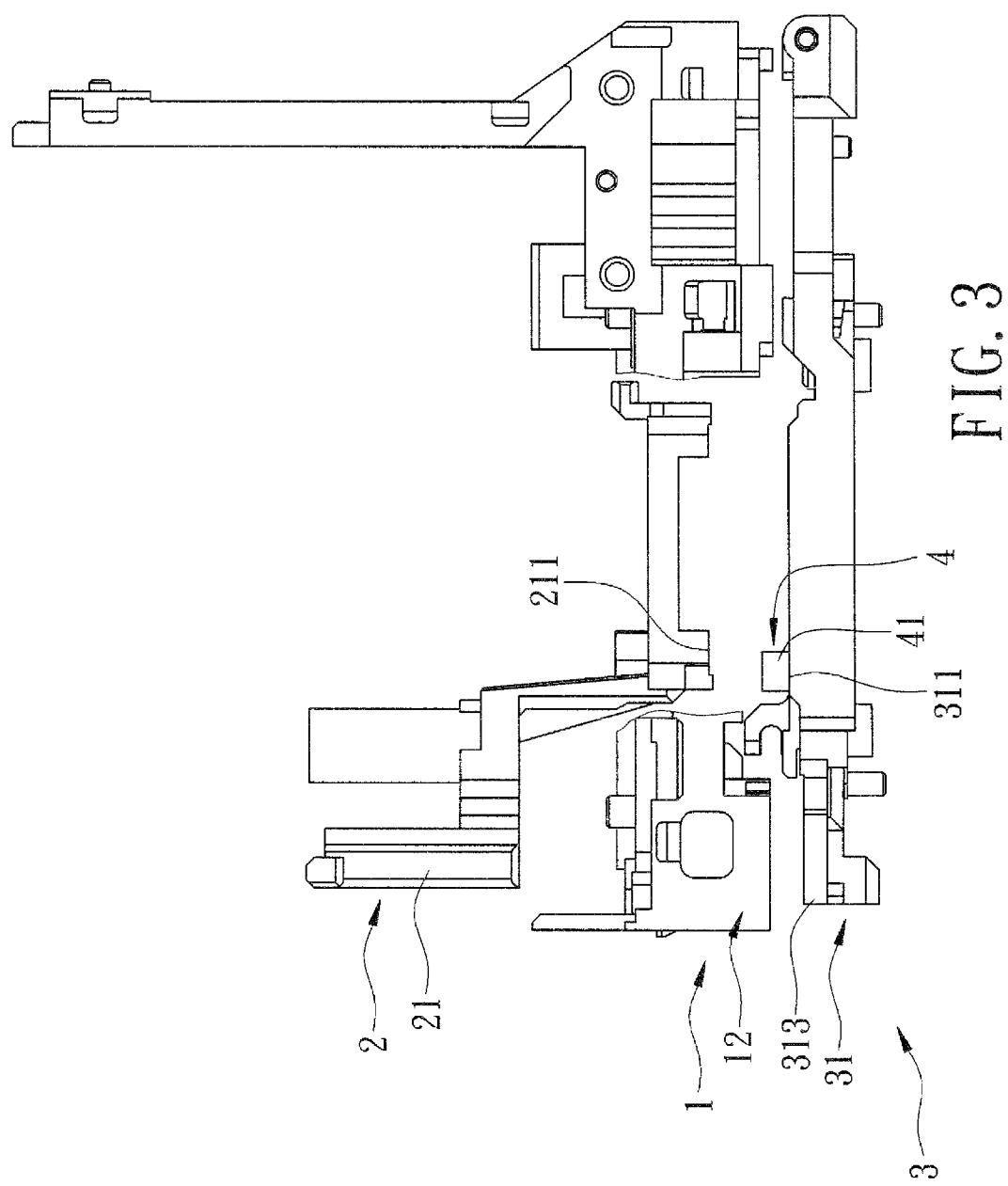
FIG. 3 is a side view of a frame unit at a working position.
Figure 4:
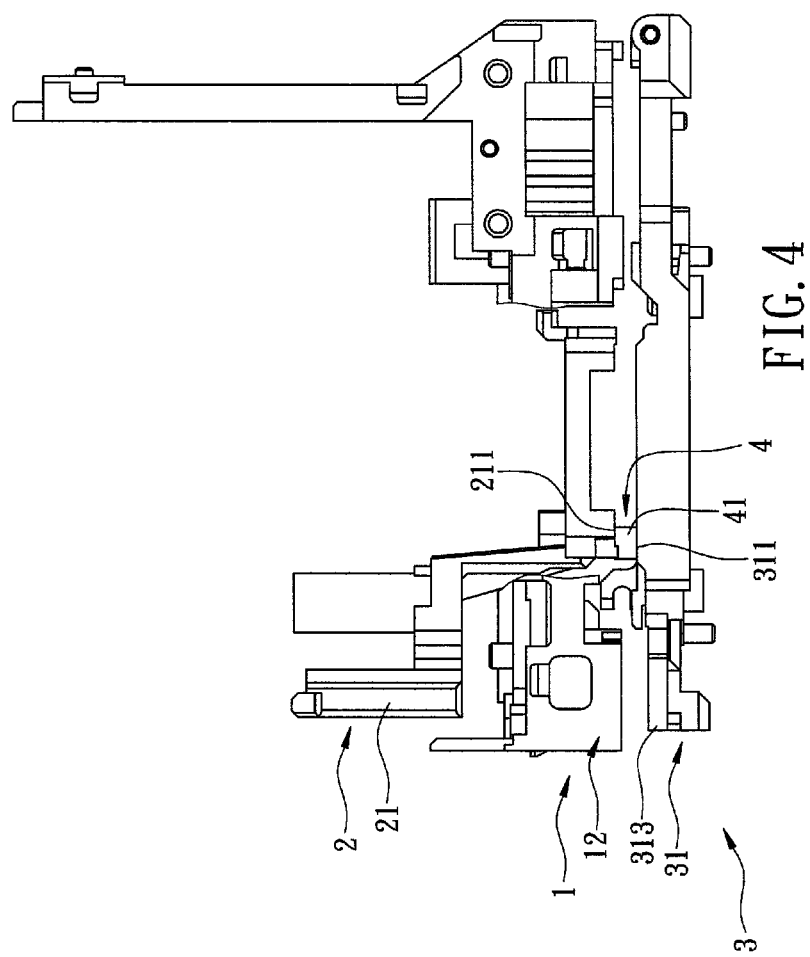
FIG. 4 is a side view of the frame unit disposed at a storage position and abutting against an elastic component.

Before the present invention is described in greater detail with reference to the preferred embodiments, it should be noted that the same reference numerals are used to denote the same elements throughout the following description.

FIGS. 1 to 4 show the first preferred embodiment of a positionable mechanism according to the present invention. The positionable mechanism includes a base unit 1, a frame unit 2, an optical image stabilizing (OIS) unit 3 and a positioning unit 4.

The base unit 1 includes a frame base 11 and an OIS base 12 connected to each other. The frame unit 2 is mounted on the frame base 11, and is movable with respect to the frame base 11 between a storage position and a working position. The OIS unit 3 is movable with respect to the OIS base 12.

The frame unit 2 includes a retractable carrier 21, a lens 22 that is disposed on the retractable carrier 21, and a motor 23 that is configured to drive the retractable carrier 21 to retract with respect to the frame base 11. The retractable carrier 21 has a first surface 211 facing the OIS unit 3, and is driven to move toward the OIS unit 3 when the frame unit 2 moves from the working position to the storage position. In the first preferred embodiment, the lens 22 is used for focusing. The frame base 11 includes a bearing 111, and the retractable carrier 21 is sleeved on and moves straightly along the bearing 111. The motor 23 is used to drive a screw rod 231, which subsequently drives a nut component 232 so as to extend or retract the retractable carrier 21 with respect to the base unit 11. It should be noted that the means of driving the lens 22 is not limited to the disclosure of this embodiment. The lens 22 that is mounted on the frame unit 2 may be used for zooming in other embodiments.

The OIS unit 3 is mounted on the OIS base 12 of the base unit 1, and includes a movable carrier 31 that has a second surface 311 facing the first surface 211, an optical element 32 that is mounted on the movable carrier 31, and a driving element 33 that is operable to drive the movable carrier 31 to move with respect to the base unit 1. In the first preferred embodiment, the optical element 32 is a charge-coupled device (CCD).

Furthermore, the movable carrier 31 of the OIS unit 3 includes a first moving frame 312 that is movable with respect to the OIS base 12 of the base unit 1 along a first direction (D1), and a second moving frame 313 that is movable with respect to the first moving frame 312 along a second direction (D2) transverse to the first direction (D1) and that is provided with the second surface 311. In the first preferred embodiment, the first moving frame 312 is mounted on the OIS base 12, and the second moving frame 313 is mounted on the first moving frame 312.

The driving element 33 includes a pair of magnets 331, 332 mounted on the OIS base 12 of the base unit 1, a pair of coils 333, 334 mounted on the second moving frame 313, and a pair of Hall elements 335, 336 mounted on the second moving frame 313. The coils 333, 334 are configured to generate induced magnetic field so as to move the magnets 331, 332, and the Hall elements 335, 336 are used for detecting positions of the magnets 331, 332, respectively.

It should be noted that the first and second moving frames 312, 313 may be formed integrally with each other, as with the movable retaining component 110 disclosed in Taiwanese Patent Application Pub. No. 201030370. The driving element 33 maybe implemented as a driving scheme other than of magnetic force, such as a motor. Modifications and variations of the OIS unit 3 are well known to those skilled in the art, and will be omitted herein for the sake of brevity.

The positioning unit 4 is disposed between the first surface 211 of the frame unit 2 and the second surface 311 of the OIS unit 3, and includes an elastic component 41 disposed on one of the first surface 211 and the second surface 311. In the first preferred embodiment, the elastic component 41 is a sponge and is disposed on the second surface 311 of the movable carrier 31 of the OIS unit 3.

When the frame unit 2 is switched from the working position (see FIG. 3) to the storage position (see FIG. 4), the retractable carrier 21 of the frame unit 2 is moved toward the second moving frame 313 of the movable carrier 31 of the OIS unit 3, and positions the movable carrier 31 of the OIS unit 3 by abutting against the elastic component 41 so as to prevent the OIS unit 3 from wobbling and generating noise when the camera is shut down. It should be noted that, for the sake of clarity, the frame base 11 and the first moving frame 312 are omitted in FIGS. 3 and 4.

Figure 5:
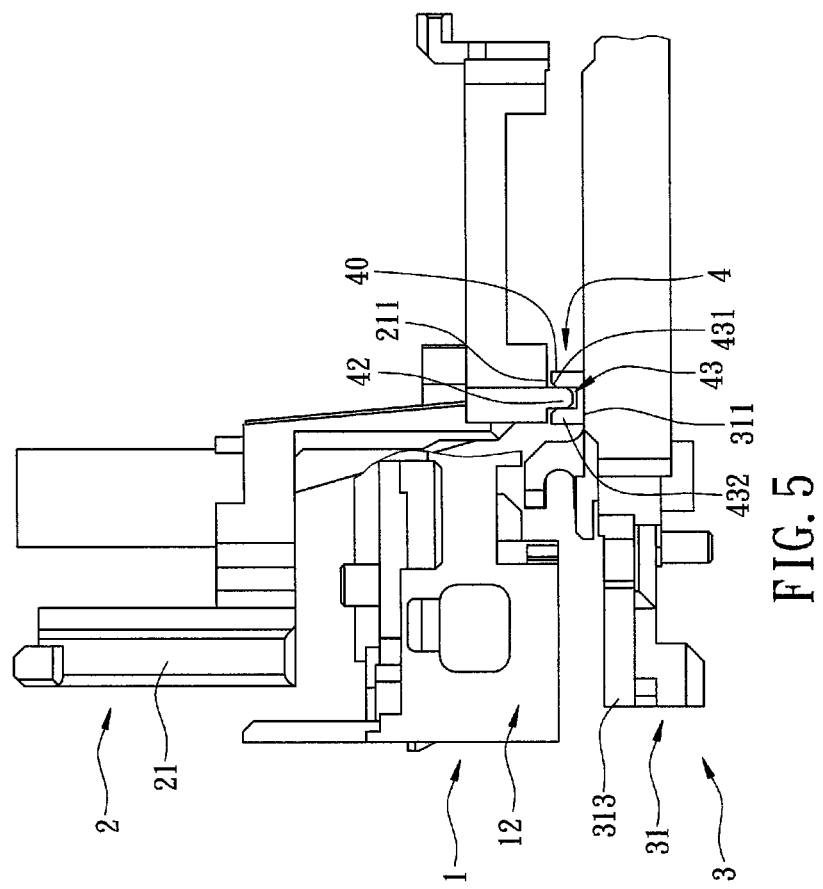
FIG. 5 is a side view of the second preferred embodiment of a positionable mechanism, where a frame unit thereof is at a storage position according to this invention.

Referring to FIG. 5, the second preferred embodiment of a positionable mechanism according to this invention is shown to be similar to the first preferred embodiment, and only differs from the first preferred embodiment in the positioning unit 4. In the second preferred embodiment, the positioning unit 4 includes a positioning pin 42 protruding from one of the first surface 211 of the frame unit 2 and the second surface 311 of the movable carrier 31 of the OIS unit 3, and a positioning seat 40 disposed at another one of the first and second surfaces 211, 311, formed with a recess 43 that is registered with the positioning pin 42, and receiving the positioning pin 42 in the recess 43 when the frame unit 2 is at the storage position. Preferably, the positioning seat 40 includes a surrounding wall 432 that defines the recess 43 with an opening facing the positioning pin 42, and that is formed with a chamfer 431 at the opening for guiding the positioning pin 42.

In the second preferred embodiment, the positioning pin 42 protrudes from the first surface 211 of the frame unit 2, and the positioning seat 40 is disposed at the second surface 311 of the OIS unit 3. When the frame unit 2 is switched from the working position to the storage position, the retracting carrier 21 of the frame unit 2 is moved toward the movable carrier 31 of the OIS unit 3, and the positioning pin 42 at the retracting carrier 21 is received by the positioning seat 40 at the OIS unit 3 to position and prevent the OIS unit 3 from wobbling and generating noise.

It should be noted that, in other embodiments, the positioning unit 4 may only include the positioning pin 42 protruding from one of the first surface 211 and the second surface 311 and abutting against another one of the first surface 211 and the second surface 311 when the frame unit 2 is at the storage position. Similarly, the OIS unit 3 can be also positioned.

To sum up, by virtue of the positioning unit 4 of the positionable mechanism of this invention disposed between the first surface 211 of the frame unit 2 and the second surface 311 of the OIS unit 3, the movable carrier 31 of the OIS unit 3 can be secured in position when the frame unit 2 is at the storage position. In such a manner, the structure of the positioning unit 4 is relatively simple, and can reduce manufacturing costs.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A positionable mechanism comprising:
 a base unit;
 a frame unit mounted on said base unit, movable with respect to said base unit between a storage position and a working position, and including
 a retractable carrier having a first surface,
 a lens disposed on said retractable carrier for focusing, and
 a motor configured to drive said retractable carrier to retract with respect to said base unit;
 an optical image stabilizing (OIS) unit mounted on said base unit, and including a movable carrier that has a second surface facing said first surface, an optical element that is mounted on said movable carrier, and a driving element that is operable to drive said movable carrier to move with respect to said base unit; and
 a positioning unit disposed between said first surface and said second surface, and configured to position said movable carrier with respect to said frame unit when said frame unit is at the storage position; and
 wherein said positioning unit includes an elastic component disposed on one of said first surface of said frame unit and said second surface of said movable carrier of said OIS unit, and said frame unit abuts against said movable carrier through said elastic component at the storage position so as to position said movable carrier.

2. The positionable mechanism as claimed in claim 1, wherein said elastic component is a sponge.

3. The positionable mechanism as claimed in claim 1, wherein said elastic component is disposed on said second surface of said movable carrier.

4. The positionable mechanism as claimed in claim 1, wherein said positioning unit includes a positioning pin protruding from one of said first surface of said frame unit and said second surface of said movable carrier of said OIS unit.

5. The positionable mechanism as claimed in claim 4, wherein said positioning unit further includes a positioning seat that is disposed at another one of said first and second surfaces, that is formed with a recess registered with said positioning pin, and that receives said positioning pin in said recess when said frame unit is at the storage position.

6. The positionable mechanism as claimed in claim 5, wherein said positioning seat includes a surrounding wall that defines said recess with an opening facing said positioning pin, and that is formed with a chamfer at said opening for guiding said positioning pin.

7. The positionable mechanism as claimed in claim 1, wherein:
 said movable carrier of said OIS unit includes a first moving frame that is movable with respect to said base unit along a first direction, and a second moving frame that is movable with respect to said base unit along a second direction transverse to the first direction and that is provided with said second surface; and
 said driving element includes a pair of magnets mounted on said base unit, a pair of coils mounted on said second moving frame, and a pair of Hall elements mounted on said second moving frame.

8. The positionable mechanism as claimed in claim 1, wherein said base unit includes a frame base and an OIS base connected to each other, said frame unit being mounted on and movable with respect to said frame base, said OIS unit being movable with respect to said OIS base.

* * * * *